(12) United States Patent
Kharlamov

(10) Patent No.: US 12,164,567 B2
(45) Date of Patent: Dec. 10, 2024

(54) APPARATUS, COMPUTER-IMPLEMENTED METHOD AND COMPUTER PROGRAM FOR AUTOMATIC ANALYSIS OF DATA

(71) Applicant: Robert Bosch GmbH, Stuttgart (DE)

(72) Inventor: Evgeny Kharlamov, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/892,996

(22) Filed: Aug. 22, 2022

(65) Prior Publication Data

US 2023/0061644 A1 Mar. 2, 2023

(30) Foreign Application Priority Data

Sep. 1, 2021 (DE) ...................... 10 2021 209 612.3

(51) Int. Cl.
G06F 16/901 (2019.01)
(52) U.S. Cl.
CPC ................................. G06F 16/9024 (2019.01)
(58) Field of Classification Search
None
See application file for complete search history.

(56) References Cited

U.S. PATENT DOCUMENTS

| | | | | |
|---|---|---|---|---|
| 2009/0222782 A1* | 9/2009 | Bayati | ...................... | H04L 41/12 716/125 |
| 2013/0151463 A1* | 6/2013 | Ritter | ...................... | G06N 5/022 706/55 |
| 2014/0059043 A1* | 2/2014 | Sundara | ................... | G06F 16/00 707/723 |
| 2014/0143281 A1* | 5/2014 | Duan | ...................... | G06F 16/211 707/798 |
| 2020/0279000 A1* | 9/2020 | Yamamoto | ............ | G06F 40/289 |
| 2020/0320483 A1* | 10/2020 | Bayireddi | .......... | G06Q 10/1053 |
| 2021/0103256 A1* | 4/2021 | Jia | ........................... | G06F 40/10 |
| 2021/0303792 A1* | 9/2021 | Lipka | ..................... | G06N 5/025 |

OTHER PUBLICATIONS

Wang et al., "Towards Multi-Facet Snippets for Dataset Search," Profiles, vol. 2465, 2019, pp. 1-6. extension://elhekieabhbkpmcefcoobjd-digjcaadp/http://ceur-ws.org/Vol-2465/profiles_paper1.pdf Downloaded Aug. 11, 2022.

Shi et al., "Keyword Search Over Knowledge Graphs via Static and Dynamic Hub Labelings," WWW '20, Proceedings of the Web Conference 2020, 2020, pp. 235-245.

Cheng et al., "Generating Illustrative Snippets for Open Data on the Web," WSDM '17, Proceedings of the Tenth ACM International Conference on Web Search and Data Mining, 2017, pp. 151-159.

* cited by examiner

*Primary Examiner* — Thu N Nguyen
(74) *Attorney, Agent, or Firm* — NORTON ROSE FULBRIGHT US LLP; Gerard A. Messina

(57) ABSTRACT

Computer-implemented method, apparatus and computer program for automatic analysis of a RDF, Resource Description Framework, dataset. The RDF dataset comprising a set of triples, wherein the RDF dataset is provided as an undirected graph comprising nodes and edges, wherein nodes represent entities and edges represent links between entities.

13 Claims, 5 Drawing Sheets

Table 5: Run-time in milliseconds (mean ± SD).

| | |
|---|---|
| PCSG | 2,806 ± 95,310 |
| IlluSnip | 856,446 ± 2,103,072 |
| PCSG-90% | 1,336 ± 70,896 |
| IlluSnip-90% | 572,099 ± 1,722,136 |
| PCSG-80% | 981 ± 47,325 |
| IlluSnip-80% | 446,110 ± 1,516,651 |

Table 4: Space savings (mean ± SD).

| PCSG | 87.02% ± 21.42% |
|---|---|
| PCSG-90% | 89.62% ± 20.98% |
| PCSG-80% | 91.45% ± 19.22% |

Table 5: Run-time in milliseconds (mean ± SD).

| | |
|---|---|
| PCSG | 2,806 ± 95,310 |
| IlluSnip | 856,446 ± 2,103,072 |
| PCSG-90% | 1,336 ± 70,896 |
| IlluSnip-90% | 572,099 ± 1,722,136 |
| PCSG-80% | 981 ± 47,325 |
| IlluSnip-80% | 446,110 ± 1,516,651 |

APPARATUS, COMPUTER-IMPLEMENTED METHOD AND COMPUTER PROGRAM FOR AUTOMATIC ANALYSIS OF DATA

CROSS REFERENCE

The present application claims the benefit under 35 U.S.C. § 119 of German Patent Application No. DE 10 2021 209 612.3 filed on Sep. 1, 2021, which is expressly incorporated herein by reference in its entirety.

FIELD

The present invention relates to an apparatus, a computer program and a computer-implemented method for automatic analysis of data.

BACKGROUND INFORMATION

A Knowledge Graph, KG, may be used to analyze data automatically. A result of an analysis of data may be determined automatically.

SUMMARY

The apparatus, the method and the computer program according to the present invention further improves the automatic analysis.

The present invention relates to a computer-implemented method for automatic analysis of a RDF, Resource Description Framework, dataset, the RDF dataset comprising a set of triples, wherein the RDF dataset is provided as an undirected graph (D) comprising nodes and edges, wherein nodes represent entities and edges represent links between entities. According to an example embodiment of the present invention, the method comprises the steps of:
generating
  for each instance-level entity at least one entity description pattern comprising at least one triple describing at least one class and/or at least one property of said entity, and
  for each edge representing an entity link between two instance-level entities at least one link description pattern comprising at least one triple describing the link between the two instance-level entities;
generating an entity-link graph by converting edges of the undirected graph into nodes;
generating a subgraph of the entity-link graph;
generating an expanded subgraph by adding a missing link for each node in the subgraph representing an entity link such that each node in the expanded subgraph representing an entity link is connected to both entities it links;
generating from the expanded subgraph a representative subset of the RDF dataset by adding
  for each node in the expanded subgraph representing an entity from the entity description pattern at least one triple describing a class of said entity, and at least one triple describing a property of said entity for each property the entity description pattern, and
  for each node in the expanded subgraph representing an entity link at least one triple from the link description pattern.

The representative subset of the RDF dataset is a pattern-coverage snippet. For reusing an RDF dataset, understanding its content is a prerequisite. To support the comprehension of its large and complex structure, existing methods mainly generate an abridged version of an RDF dataset by extracting representative data patterns as a summary. As a complement, recent attempts extract a representative subset of concrete data as a snippet. Snippet and summary provide complementary views of an RDF dataset: snippets containing representative instance-level triples and summaries comprising representative schema-level patterns. According to an example embodiment of the present invention, the strength of a summary is injected into a snippet by generating a pattern-coverage snippet that best exemplifies the patterns of entity descriptions and links in an RDF dataset.

Preferably, when generating the entity-link graph by converting edges of the undirected graph into nodes, all nodes comprising the same entity description pattern or the same link description pattern form a group.

Preferably, the subgraph of the entity-link graph is generated such that the subgraph connects at least one node from each group.

According to a preferred example embodiment of the present invention, generating from the expanded subgraph a representative subset of the RDF, the method comprises adding for each node in the expanded subgraph representing an entity from the entity description pattern all the triples describing a class of said entity, and only one triple describing a property of said entity for each property the entity description pattern. An RDF dataset comprises a set of triples, namely <subject, predicate, object> triples. Subjects or objects of such triples are referred to as entities. Predicates are referred to as relations. The set of triples can be naturally represented as a directed graph, whose nodes and edges are labelled. Elements of the RDF data set and the knowledge graph can be distinguished between instance-level elements and schema-level elements, wherein a schema is formal description of the element and the instance is the specific information actually stored in the dataset.

The schema-level elements in these triples form the entity description pattern (EDP) of e, consisting of sets of classes (C), forward properties (FP), and backward properties (BP):

$edp(e,D) = <C(e,D), FP(e,D), BP(e,D)>$, $C(e,D) = \{c : \exists <e, \text{rdf:type}, c> \in D\}$, $FP(e,D) = \{p : \exists <e, p, o> \in D\} \setminus \{\text{rdf:type}\}$, $BP(e,D) = \{p : \exists <s, p, e> \in D\}$.

A triple where the object is an entity is of particular interest as it represents a link between two entities. The predicate and the EDPs of the two entities in such a triple $<e_i, p, e_j>$ form the link pattern (LP) of this triple:

$lp(<e_i, p, e_j>, D) = <edp(e_i, D), p, edp(e_j, D)>$.

According to a preferred example embodiment of the present invention, the method comprises further a step of labelling each instance-level entity with its entity description pattern and/or labelling each edge representing an entity link between two instance-level entities with its link description pattern.

According to a preferred example embodiment of the present invention, the step of converting edges of the undirected graph into nodes comprises subdividing each edge.

According to a preferred example embodiment of the present invention, generating a subgraph of the entity-link graph is based on solving a group steiner tree problem. To handle disconnectivity in a data set, preferably the union of all entity description patterns and all link description patterns is considered as the universal set and for each component $D_j$ of the RDF dataset, $EDP(D_j) \cup LP(D_j) \subseteq EDP$ (D)∪LP(D) is a set, wherein the method comprises a step of finding the smallest number of sets whose union equals the universal set.

Preferably, the method comprises a step of determining the frequency of the entity description patterns and/or the frequency of the link description patterns. The frequency is defined as the occurrence of said pattern in the RDF dataset.

Preferably, the method comprises a step of ranking the entity description patterns and/or the link description patterns according to their frequency, for example based on descending order.

According to a preferred example embodiment of the present invention, the method comprises a step of limiting the subgraph of the entity-link graph based on the frequency of entity description patterns and/or based on the frequency of link description patterns, such that the subgraph connects at least one node from each group, wherein the groups refer to entity description patterns and/or link description patterns with a frequency above a defined threshold.

Further advantageous embodiments are derivable from the following description and the figures.

DETAILED DESCRIPTION OF EXAMPLE EMBODIMENTS

Figure 1:
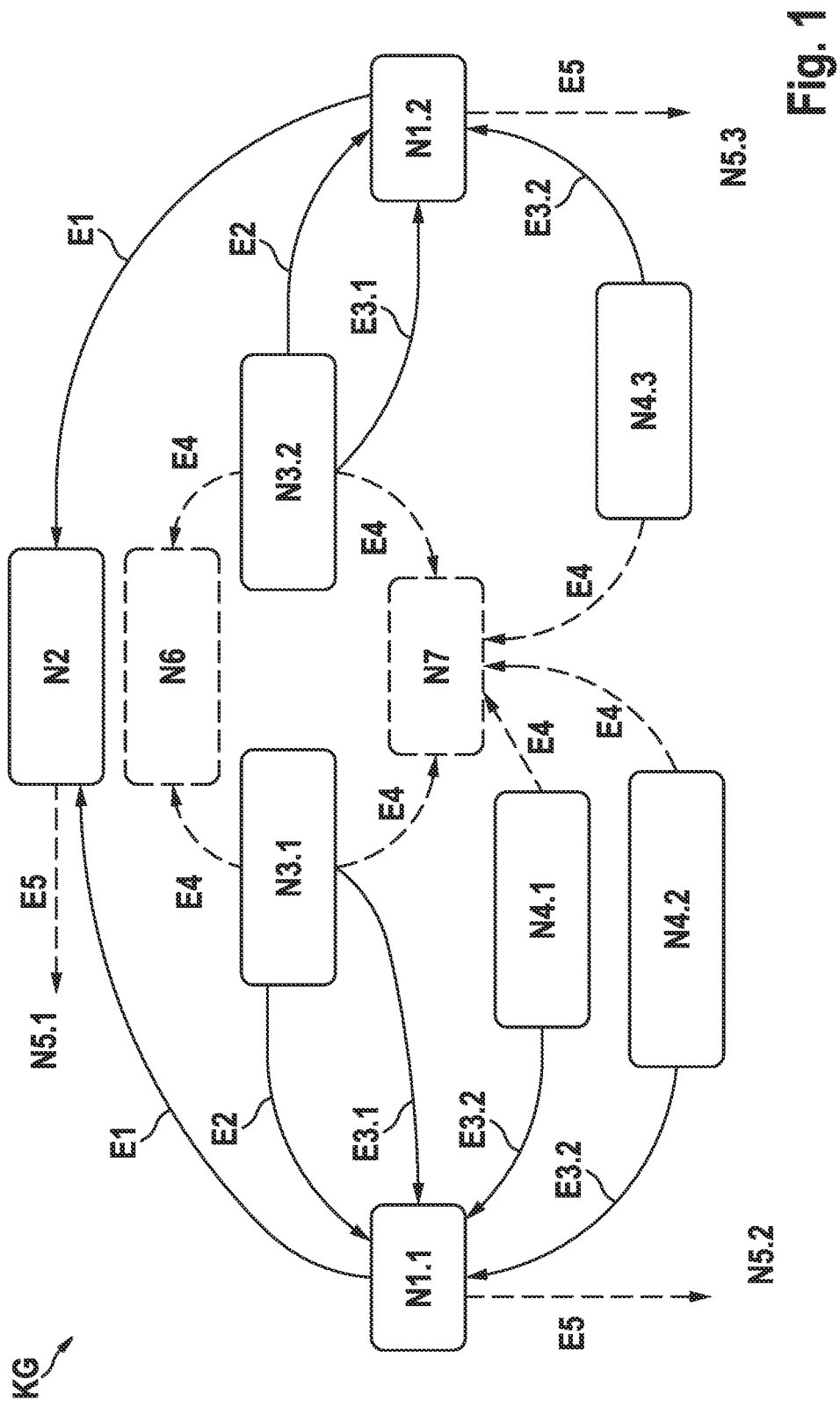
FIG. 1 depicts an exemplary knowledge graph, according to the present invention.

FIG. 1 depicts an exemplary knowledge graph, KG, 100. The knowledge graph is a presentation of data of an RDF data set D, which comprises a set of triples, namely <subject, predicate, object> triples. Subjects or objects of such triples are referred to as entities. Predicates are referred to as relations. The set of triples of a KG can be naturally represented as a directed graph, whose nodes and edges are labelled. Elements of the RDF data set and the knowledge graph can be distinguished between instance-level elements and schema-level elements, wherein a schema is formal description of the element and the instance is the specific information actually stored in the dataset.

Nodes N1.1, N1.2, N2, N3.1, N3.2, N4.1, N4.2, N4.3, N5.1, N5.2 and N5.3 of the knowledge graph KG refer to instance-level entities, for example:

N1.1: Germany, short DE
N1.2: United Kingdom, short UK
N2: Europe,
N3.1: Berlin,
N3.2: London,
N4.1: Munich,
N4.2: Augsburg,
N4.3: Oxford,
N5.1: specific number1
N5.2: specific number2
N5.3: specific number3

Nodes N6 and N7 of the knowledge graph KG refer to schema-level entities, for example:

N6: Capital
N7: City.

Edges E1, E2, E3.1 and E3.2 of the knowledge graph KG refer to instance-level relations, for example:

E1: part of
E2: capital of
E3.1 located in
E3.2 located in.

Edges E4 and E5 of the knowledge graph KG refer to schema-level relations, for example:

E4: type
E5: area.

In the triples of the RDF data set D, an instance-level entity e is described by a subset of triples where e is the subject or the object. The schema-level elements in these triples form the entity description pattern (EDP) of e, consisting of sets of classes (C), forward properties (FP), and backward properties (BP):

$$edp(e,D) = <C(e,D), FP(e,D), BP(e,D)>,$$

$$C(e,D) = \{c : \exists <e, \text{rdf:type}, c> \in D\},$$

$$FP(e,D) = \{p : \exists <e, p, o> \in D\} \setminus \{\text{rdf:type}\},$$

$$BP(e,D) = \{p : \exists <s, p, e> \in D\}.$$

A triple where the object is an entity is of particular interest as it represents a link between two entities. The predicate and the EDPs of the two entities in such a triple $<e_i, p, e_j>$ form the link pattern (LP) of this triple:

$$lp(<e_i, p, e_j>, D) = <edp(e_i, D), p, edp(e_j, D)>.$$

Referring now to FIG. 1, the following exemplary patterns can be obtained:

$$edp(Berlin, D) = edp(London, D) = p1 = <\{Capital, City\}, \{capitalOf, locatedIn\}, \emptyset>$$

$$edp(DE, D) = edp(UK, D) = p2 = <\emptyset, \{partOf, area\}, \{capitalOf, locatedIn\}>$$

$$lp(<Berlin, locatedIn, DE>, D) = lp(<London, locatedIn, UK>, D) = <p1, locatedIn, p2>.$$

The set of all EDPs and the set of all LPs in D, denoted by EDP(D) and LP(D), respectively, are obtained by iterating over all entities and links in D.

Preferably, each node of the KG in FIG. 1 can be labelled with its EDP, and each edge can be labelled with its LP.

Figure 2:
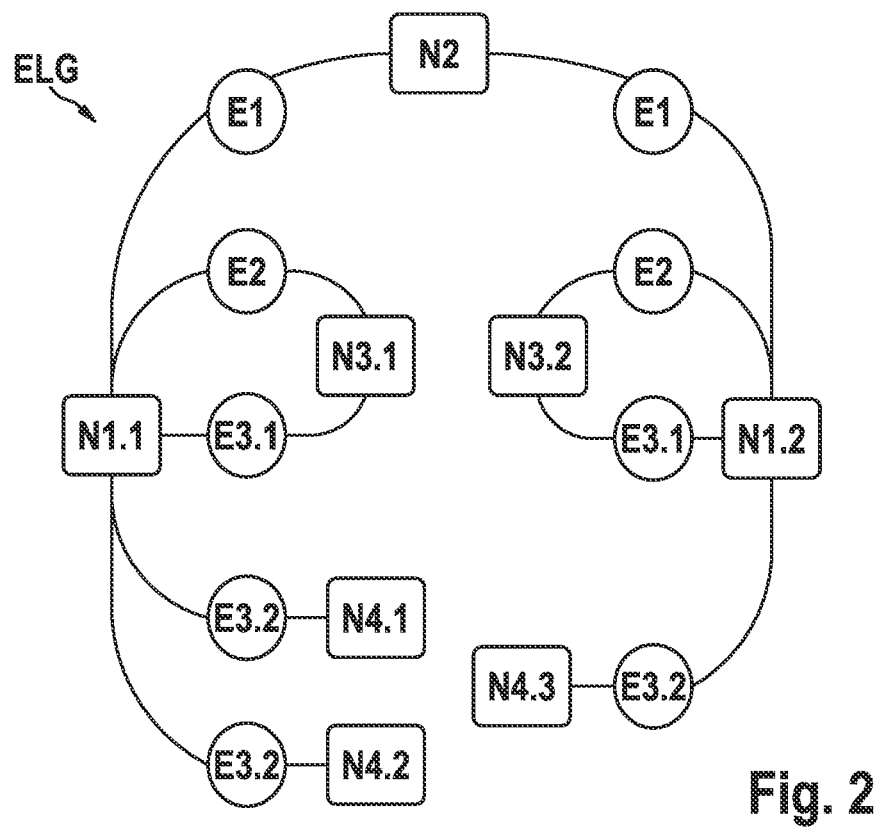
FIG. 2 depicts aspects of a method for automatic analysis of a RDF, Resource Description Framework, dataset D, according to an example embodiment of the present invention.

FIG. 2 represents an entity-link graph representation, ELG, of the RDF data set D. The ELG can be obtained by converting labelled edges of KG into labelled nodes by subdividing each edge. The subdivision is referred to as the entity-link graph representation of the RDF dataset D. The entity-link graph ELG is reduced to contain only instance-level elements.

Figure 3:
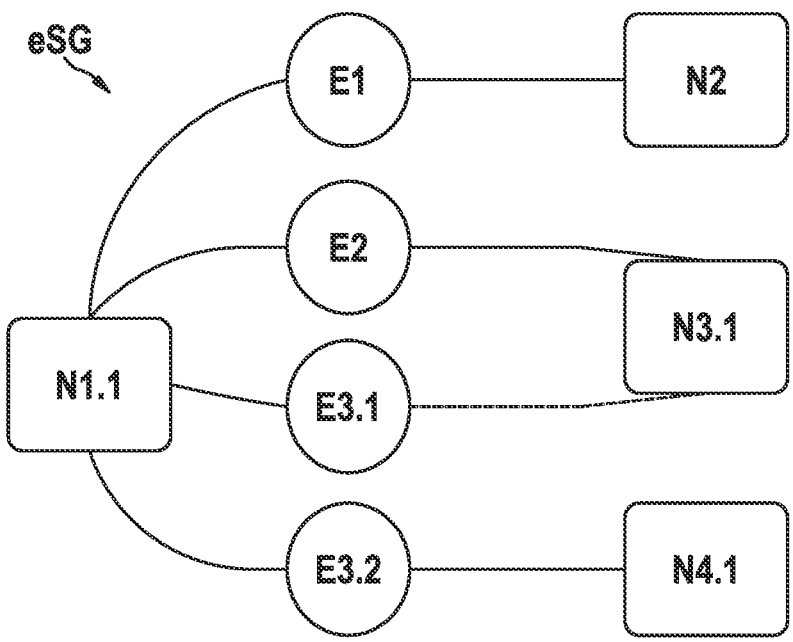
FIG. 3 depicts further aspects of the method for automatic analysis of the RDF, Resource Description Framework, dataset D, according to an example embodiment of the present invention.

FIG. 3 represents a expanded subgraph eSG of the entity-link graph ELG. The expanded subgraph eSG is generated as follows:

First, a subgraph SG of the entity-link graph ELG, that connects at least one node from each group, is generated. The subgraph SG is generated based on solving a group steiner tree problem. Essentially, this means generating the smallest connected subgraph of the entity link graph ELG, whose node labels covers the entity description pattern EDP and the link description pattern LP. According to one embodiment, the subgraph is generated as an unweighted version of the group Steiner tree problem: all nodes having the same label form a group. Solving the group steiner tree problem requires finding a smallest tree that connects at least one node from each group and hence it covers all distinct labels. The group steiner tree problem can be solved using a state-of-the-art approximation algorithm, for example KeyKG+, described in Shi, Y., Cheng, G., Kharlamov, E., "Keyword search over knowledge graphs via static and dynamic hub labellings," in: WWW 2020. pp. 235-245 (2020).

Referring now to FIG. 2, the subgraph contains the following nodes N1.1, N2, N3.1 and N41, which represent entities and the following E1, E2, E3.1 and E3.2, which represent links between entities.

Second, the expanded subgraph eSG is generated by adding a missing link for each node in the subgraph representing an entity link such that each node in the expanded subgraph representing an entity link is connected to both entities it links. This is indicated by the dotted line in FIG. 3 between nodes E3.1 and N3.1. According to an embodiment, for each leaf in the computed subgraph representing an entity link, the subgraph is expanded to contain both entities it links.

Figures 4, 5:
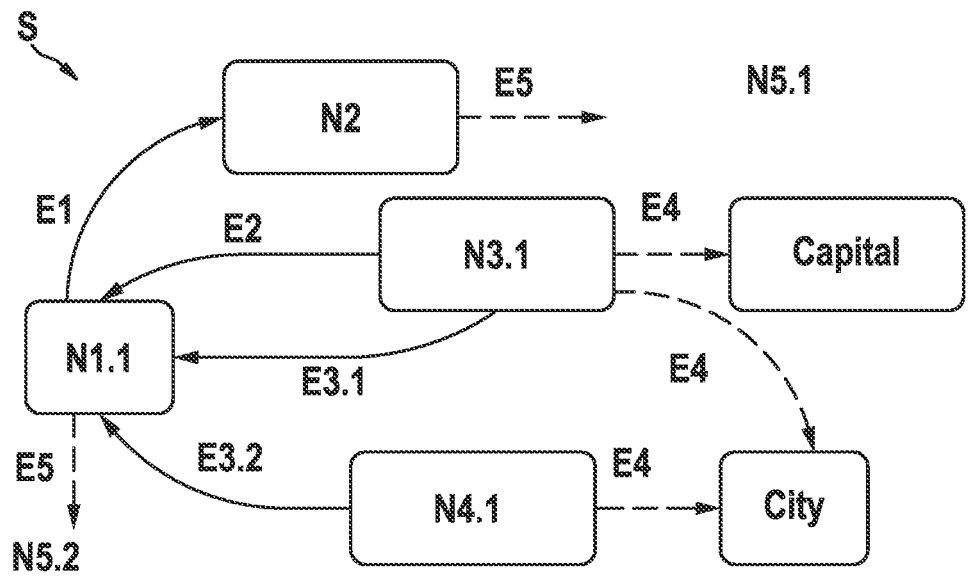
FIG. 4 depicts further aspects of the method for automatic analysis of the RDF, Resource Description Framework, dataset D, according to an example embodiment of the present invention.
FIG. 5 depicts aspects of the evaluation of the method with regard to space savings, according to an example embodiment of the present invention.

Finally, FIG. 4 discloses a representative subset S of the RDF dataset D generated from the expanded subgraph eSG.

The representative subset S is a pattern-coverage snippet S of the RDF dataset D.

According to the example of FIG. 4, the representative subset S can be derived from the expanded subgraph eSG the a as follows. Adding for each node in the expanded subgraph eSG representing an entity from the entity description pattern all the triples describing a class of said entity, and only one triple describing a property of said entity for each property the entity description pattern. Further, for each node in the expanded subgraph SG representing an entity link, its corresponding triple from the link description pattern LP is added.

The embodiments described with regard to FIG. 1 to FIG. 4 are based on assuming connectivity of the RDF dataset D. Disconnectivity of the RDF dataset D can be handled as follows.

Disconnectivity can be considered as an instance of the well-known set cover problem where the union of all entity description patterns EDP(D) and all link description patterns LP(D) is considered as the universal set and for each component $D_j$ of the RDF dataset D, $EDP(D_j) \cup LP(D_j) \subseteq EDP(D) \cup LP(D)$ is a set. The set cover problem is solved by finding the smallest number of sets whose union equals the universal set.

The solving comprises an iteratively generation of a representative subset S until the universal set is fully covered. For each component $D_i$ that contains the largest number of uncovered patterns a representative subset S is generated as described before.

According to an advantageous embodiment, the generating of the representative subset S can be modified to generate a possibly smaller sub-snippet of a component $D_i$. The sub-snippet only needs to cover the part of the union of the entity description patterns $EDP(D_i)$ and the description patterns $LP(D_i)$ which intersects with the universal set rather than with the complete union $EDP(D_i) \cup LP(D_i)$. Thereby, when generating the subgraph SG of ELG the groups that correspond to the patterns in the union $EDP(D_i) \cup LP(D_i)$ without the universal set can be ignored.

Thereby, the compactness of the representative subset S and the efficiency of its generation can be improved by aiming at finding a smallest subset of components that cover all the patterns in the RDF dataset D.

In case the RDF dataset D is highly heterogeneous and contains many different patterns, the representative subset S will inevitably be very large. The following steps achieve a trade-off between pattern coverage and snippet size to handle high heterogeneity. Patterns in the RDF dataset D may not be equally important. The relative frequency of an entity description pattern EDP is defined as the proportion of entities that have this entity description pattern EDP in the RDF dataset D. The relative frequency of an link description pattern LP is defined analogously. More frequent patterns can be considered more important. The generated patterns EDP, LPs can be ranked in their descending order of relative frequency.

When generating the subgraph SG of the entity-link graph ELG, the subgraph SG can be limited based on a frequency of entity description patterns and/or based on a frequency of link description patterns, such that the subgraph connects at least one node from each group, wherein the groups refer to entity description patterns and/or link description patterns with a frequency above a defined threshold. The threshold is for example describing a percentage.

Based on this, the generated representative subset S is a possibly smaller snippet that only covers the most important patterns in the RDF dataset D.

The following embodiment refers to generating a query-biased representative subset S.

A keyword query Q comprises at least one keyword, or more keywords. Every keyword is considered as a keyword pattern. Each entity or entity link in the RDF dataset D is extended to have a set of patterns consisting of its entity description pattern EDP or link description pattern LP, and all the keyword patterns it matches. The computation can be done by an off-the-shelf matcher. An entity e matches a keyword $q \in Q$ if q appears in any triple describing the entity e the RDF dataset D. An entity link $<e_i, p, e_j>$ matches a keyword q if the keyword q appears in the textual form of p. Accordingly for each keyword-pattern of a keyword $q \in Q$ a group consisting of all entities and entity links that match the keyword q is added. Thereby, when generating the subgraph SG of the entity-link graph ELG, such that it connects at least one node from each group, the keywords are taken into account by adding for each keyword q the group consisting of all entities and entity links that match the respective keyword q.

Based on this, the generated representative subset S matches all the keywords in Q.

Cheng, G., Jin, C., Ding, W., Xu, D., Qu, Y., "Generating illustrative snippets for open data on the web," in: WSDM 2017. pp. 151-159 (2017) describes also a method for generating snippets, called IlluSnip. To compactly exemplify the content of a large RDF dataset, IlluSnip generates a snippet by formulating a maximum-weight-and-coverage connected graph problem. It aims at extracting an optimum subset of k triples represented as a connected RDF graph that covers the most frequent classes, properties, and the most central entities in the RDF dataset. Different from IlluSnip, KSD, described in Wang, X., Cheng, G., Kharlamov, E., "Towards multi-facet snippets for dataset search;" in: PROFILES & SemEx 2019. pp. 1-6 (2019), formulates a weighted maximum coverage problem where it removes the constraint on connectivity. Its objective of optimization further aims at covering the most keywords in a keyword query so that it is suitable for RDF dataset search engines. Compared with IlluSnip and KSD, this approach also aims at covering schema-level elements, wherein the focus is on patterns of entity descriptions and links which are combinations of classes and properties. Patterns can provide a "higher-order" preview of data than separate classes and properties.

In the following, the space saving and run-time of this approach is compared to IluSnip and KSD. This approach is referred to as PSCG.

The space saving of an approach on an RDF dataset is defined as:

$$\text{space saving} = 1 - \frac{\text{number of triples in the generated snippet number of triples in the } RDF \text{ dataset}}{\text{number of triples in the } RDF \text{ dataset}}$$

The size of a snippet is reported in terms of the number of triples. Further, the run-time of each approach on an RDF dataset is reported.

For the evaluation datasets were retrieved with RDF dumps from two data portals: DataHub.io and Data.gov, wherein Apache Jena 3.9.0 was used to parse 9,544 RDF datasets. It has to be noted, that many entities in datasets from Data.gov are untyped and are described by uniform patterns, probably converted from tabular data.

Figure 6:
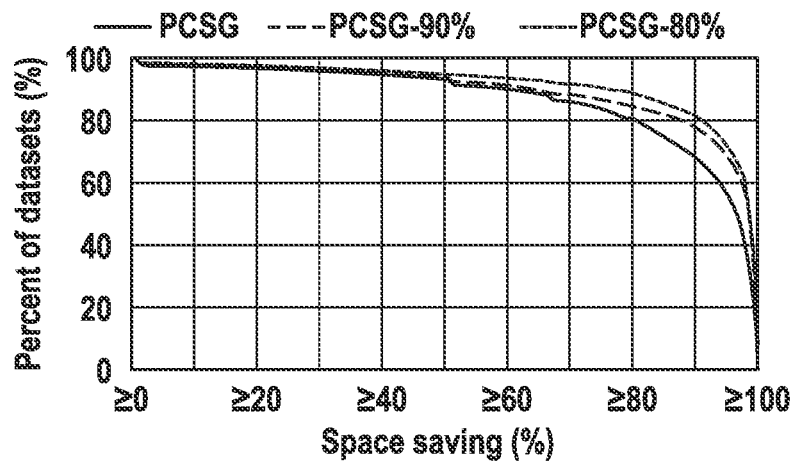
FIG. 6 depicts aspects of the evaluation of the method with regard to cumulative distributions of space savings, according to an example embodiment of the present invention.
Figure 7:
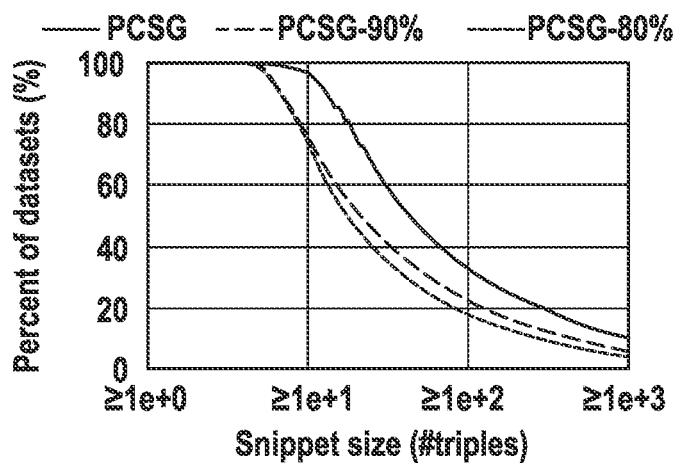
FIG. 7 depicts aspects of the evaluation of the method with regard to cumulative distributions of snippet sizes, according to an example embodiment of the present invention.

The space saving of the PSCG approach was calculated on each of the 9,544 RDF datasets. The results are summarized in the table of FIG. 5. The PSCG approach substantially reduced the size of an RDF dataset by an average of about 90%. The space savings of PSCG, PSCG-90%, and PSCG-80% were above 95% on 57%, 69%, and 72% of all RDF datasets, respectively, as illustrated by the cumulative distributions in FIG. 6. The median numbers of triples in their generated snippets were only 41, 20, and 17, respectively, as illustrated by the cumulative distributions in FIG. 7. The results support the compactness of the snippets generated with the PSCG approach.

Figures 8, 9:
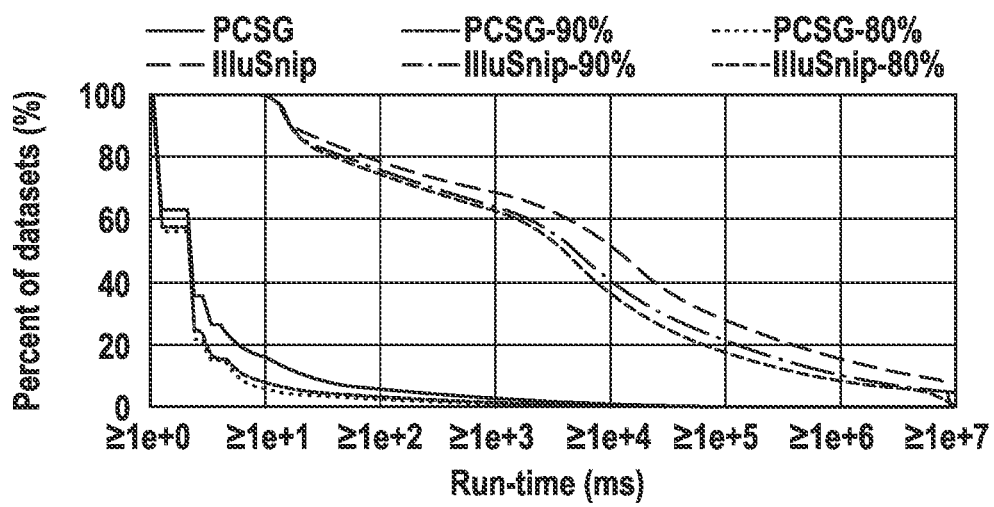
FIG. 8 depicts aspects of the evaluation of the method with regard to a run-time, according to an example embodiment of the present invention.
FIG. 9 depicts aspects of the evaluation of the method with regard to cumulative distributions of the run-time, according to an example embodiment of the present invention.

For each approach, the run-time on each of the 9,544 RDF datasets was recorded. The results are summarized in the table depicted in FIG. 8. PSCG(−τ) was more than two orders of magnitude faster than IlluSnip. The run-time of PSCG, PSCG-90%, and PSCG-80% was below one second on 98%, 98%, and 99% of all RDF datasets, respectively, as illustrated by the cumulative distributions in FIG. 9. The results support the efficiency of computation of the PSCG approach. However, for several highly heterogeneous datasets containing thousands of EDPs and LPs, PSCG(−τ) used more than an hour. Though still faster than IlluSnip and acceptable as offline computation, it suggested room for further improving the performance of the PSCG approach.

The method is preferably applied when processing RDF datasets with a neural network. The dataset comprises for example data from the field of manufacturing or production, for example information on materials and substances and their characteristics. The RDF datasets are processed, for example with regard to automation, diagnostics and optimization. The representative subset S of the RDF dataset can be processed first for a quick estimation or evaluation of the RDF dataset.

Further embodiments refer to the use of the computer-implemented method for processing RDF datasets, in particular with a neural network. The use of the method refers to automatically generating the representative subset S of the RDF dataset, thereby extracting information from text data, for example relating to entities, in particular persons, places, organizations, etc., and/or relating to concepts, in particular proteins, chemicals, materials, automation processes, diagnostics and optimization.

Further embodiments refer to the use of the computer-implemented method for processing a number of RDF datasets, at least two RDF datasets, in particular with a neural network, comprising the steps receiving a keyword query Q, generating query-biased representative subset S of the at least two RDF datasets, and determining a similarity and/or a degree of the similarity between the keyword query Q and each query-biased representative subset S. Based on the similarity and/oder the degree of similarity a suitable representative subset and therefore a suitable RDF dataset with regard to the keyword query Q can be determined. The determination of similarity and/or the degree of the similarity can be based for example on vector embeddings of the words, namely the keywords and the elements of the representative subset, in a high-dimensional vector space embeddings, wherein words are similar if they are close to each other in the vector space.

Additional embodiments relate to the use of the computer-implemented method for creating databases, in particular structured knowledge databases, in particular knowledge graphs, wherein the method is applied according to the embodiments, for extracting information, for example generating the representative subset S, and the information, for example the the representative subset S, is used for creating databases, in particular structured knowledge databases, in particular knowledge graphs.

The method according to the embodiments can be applied to RDF datasets from different domains.

What is claimed is:

1. A computer-implemented method for automatic analysis of a Resource Description Framework (RDF) dataset, the RDF dataset including a set of triples, the RDF dataset being provided as an undirected graph including nodes and edges, the nodes representing entities and the edges representing links between the entities, the method comprising the following steps:
generating:
for each node of the nodes representing an instance-level entity of the entities, at least one entity description pattern including at least one triple describing at least one of: (i) at least one class of the instance level entity, and (ii) at least one property of the instance-level entity, and
for each edge of the edges representing an entity link between two instance-level entities of the entities, at least one link description pattern including at least one triple describing the entity link between the two instance-level entities;

generating an entity-link graph by converting the edges that represent an entity link between two instance-level entities of the undirected graph into nodes, the converting of the edges including subdividing each edge, the subdividing of each edge including adding a respective node to represent the edge and linking the respective node to those of the nodes that represent the instance-level entities that were linked by the edge, wherein all nodes having the same entity description pattern form a respective group, and all nodes having the same link description pattern form a respective group;

generating a subgraph of the entity-link graph, that connects at least one node from each group, the generating of the subgraph being based on solving a group Steiner tree problem including finding a smallest tree of the entity-link graph that connects together at least one node from each group so that the smallest tree covers all distinct entity description patterns of the generated entity description patterns and all distinct link description patterns of the generated link description patterns, wherein the subgraph is the found smallest tree;

generating an expanded subgraph by adding a missing link for each node in the subgraph representing an entity link such that each node in the expanded subgraph representing an entity link is connected to both entities it links;

generating from the expanded subgraph a representative subset of the RDF dataset by adding to the expanded subgraph:

for each node in the expanded subgraph representing an entity from the entity description pattern of the node, at least one triple describing a class of the entity, and at least one triple describing a property of the entity for each property from the entity description pattern of the node, and for each node in the expanded subgraph representing an entity link, at least one triple from the link description pattern of the node.

2. The method according to claim 1, further comprising:
at least one of: (i) labelling each instance-level entity with its entity description pattern, and (ii) labelling each edge representing an entity link between two instance-level entities with its link description pattern.

3. The method according to claim 1, wherein the union of all entity description patterns (EDP) and all link description patterns (LP) is considered as a universal set and for each component $D_j$ of the RDF dataset (D), EDP $(D_j)$∪LP $(D_j)$ ⊆EDP(D)∪LP (D) is a set, wherein the method further comprises finding a smallest number of sets whose union equals the universal set.

4. The method according to claim 1, wherein the method further comprises limiting the subgraph of the entity-link graph at least one of: (i) based on a frequency of entity description patterns, and (ii) based on a frequency of link description patterns, wherein the limiting is such that the subgraph connects at least one node from each group, wherein the groups refer to at least one of: (i) entity description patterns with frequency above a first defined threshold, and (ii) link description patterns with a frequency above a second defined threshold.

5. The method according to claim 1, wherein the method further comprises receiving a keyword query, generating keyword pattern for each keyword of the keyword query, and adding, for each keyword pattern, a group including all entities and entity links that match the keyword when generating the subgraph of the entity-link graph.

6. An apparatus for automatic analysis of a Resource Description Framework (RDR) dataset, the RDF dataset including a set of triples, the RDF dataset being provided as an undirected graph including comprising nodes and edges, wherein the nodes represent entities and the edges represent links between the entities, the apparatus comprising:
at least one processor configured to:
generate:
for each node of the nodes representing an instance-level entity of the entities, at least one entity description pattern including at least one triple describing at least one of: (i) at least one class of the instance-level entity, and (ii) at least one property of the instance-level entity, and
for each edge of the edges representing an entity link between two instance-level entities of the entities, at least one link description pattern including at least one triple describing the entity link between the two instance-level entities;

generate an entity-link graph by converting the edges that represent an entity link between two instance-level entities of the undirected graph into nodes, the converting of the edges including subdividing each edge, the subdividing of each edge including adding a respective node to represent the edge and linking the respective node to those of the nodes that represent the instance-level entities that were linked by the edge, wherein all nodes having the same entity description pattern form a respective group, and all nodes having the same link description pattern form a respective group;

generate a subgraph of the entity-link graph, that connects at least one node from each group, the generating of the subgraph being based on solving a group Steiner tree problem including finding a smallest tree of the entity-link graph that connects together at least one node from each group so that the smallest tree covers all distinct entity description patterns of the generated entity description patterns and all distinct link description patterns of the generated link description patterns, wherein the subgraph is the found smallest tree;

generate an expanded subgraph by adding a missing link for each node in the subgraph representing an entity link such that each node in the expanded subgraph representing an entity link is connected to both entities it links;

generate from the expanded subgraph a representative subset of the RDF dataset by adding to the expanded subgraph:

for each node in the expanded subgraph representing an entity from the entity description pattern of the node, at least one triple describing a class of the entity, and at least one triple describing a property of the entity for each property of the entity description pattern of the node, and for each node in the expanded subgraph representing an entity link at least one triple from the link description pattern of the node.

7. The apparatus according to claim 6, wherein the apparatus is configured to at least one of: (i) label each instance-level entity with its entity description pattern, and (ii) label each edge representing an entity link between two instance-level entities with its link description pattern.

8. The apparatus according to claim 6, wherein the apparatus is configured to convert the edges of the undirected graph into nodes by subdividing each edge.

9. The apparatus according to claim 6, wherein the apparatus is configured to generate a subgraph of the entity-link graph based on solving a group steiner tree problem.

10. The apparatus according to claim 6, wherein the union of all entity description patterns and all link description patterns is considered as a universal set, and for each component $D_j$ of the RDF dataset (D), $EDP(D_j) \cup LP(D_j) \subseteq EDP(D) \cup LP(D)$ is a set, wherein the apparatus is configured to find a smallest number of sets whose union equals the universal set.

11. The apparatus according to claim 6, wherein the apparatus is configured to limit the subgraph of the entity-link graph at least one of: (i) based on a frequency of entity description patterns, and (ii) based on a frequency of link description patterns, wherein the limiting is such that the subgraph connects at least one node from each group, wherein the groups refer to at least one of: (i) entity description patterns with a frequency above a first defined threshold, and (ii) link description patterns with a frequency above a second defined threshold.

12. The apparatus according to claim 6, wherein the apparatus is configured to receive a keyword query, generate a keyword pattern for each keyword of the keyword query, and add, for each keyword pattern, a group consisting of all entities and entity links that match the keyword when generating the subgraph of the entity-link graph.

13. A non-transitory computer-readable medium on which is stored a computer program for automatic analysis of a Resource Description Framework (RDF) dataset, the RDF dataset including a set of triples, the RDF dataset being provided as an undirected graph including nodes and edges, the nodes representing entities and the edges representing links between the entities, the computer program, when executed by a computer, causing the computer to perform the following steps:
generating:
for each node of the nodes representing an instance-level entity of the entities at least one entity description pattern including at least one triple describing at least one of: (i) at least one class of the instance-level entity, and (ii) at least one property of the instance-level entity, and
for each edge of the edges representing an entity link between two instance-level entities of the entities, at least one link description pattern including at least one triple describing the entity link between the two instance-level entities;
generating an entity-link graph by converting the edges that represent an entity link between two instance-level entities of the entities of the undirected graph into nodes, the converting of the edges including subdividing each edge, the subdividing of each edge including adding a respective node to represent the edge and linking the respective node to those of the nodes that represent the instance-level entities that were linked by the edge, wherein all nodes having the same entity description pattern form a respective group, and all nodes having the same link description pattern form a respective group;
generating a subgraph of the entity-link graph, that connects at least one node from each group, the generating of the subgraph being based on solving a group Steiner tree problem including finding a smallest tree of the entity-link graph that connects together at least one node from each group so that the smallest tree covers all distinct entity description patterns of the generated entity description patterns and all distinct link description patterns of the generated link description patterns, wherein the subgraph is the found smallest tree;
generating an expanded subgraph by adding a missing link for each node in the subgraph representing an entity link such that each node in the expanded subgraph representing an entity link is connected to both entities it links;
generating from the expanded subgraph a representative subset of the RDF dataset by adding to the expanded subgraph:
for each node in the expanded subgraph representing an entity from the entity description pattern of the node, at least one triple describing a class of the entity, and at least one triple describing a property of the entity for each property from the entity description pattern of the node, and
for each node in the expanded subgraph representing an entity link at least one triple from the link description pattern of the node; and
receiving a keyword query, generating a keyword pattern for each keyword of the keyword query, and adding, for each keyword pattern, a group including all entities and entity links that match the keyword when generating the subgraph of the entity-link graph.

* * * * *